United States Patent [19]

Yamazaki et al.

[11] Patent Number: 4,513,126

[45] Date of Patent: Apr. 23, 1985

[54] ACRYLONITRILE POLYMER, PROCESS FOR THE PREPARATION THEREOF AND FIBER PREPARED THEREFROM

[75] Inventors: Kaoru Yamazaki, Akashi; Fukashi Shibuya, Kobe, both of Japan

[73] Assignee: Konegafuchi Kagaku Kogyo Kabushiki Kaisha, Osaka, Japan

[21] Appl. No.: 444,327

[22] Filed: Nov. 24, 1982

[30] Foreign Application Priority Data

Nov. 27, 1981 [JP] Japan ................. 56-191379

[51] Int. Cl.³ .............................................. C08F 2/00
[52] U.S. Cl. .................................... 526/87; 526/287; 526/341; 526/342
[58] Field of Search ................. 526/341, 87, 287, 342

[56] References Cited

U.S. PATENT DOCUMENTS

| | | | |
|---|---|---|---|
| 3,310,535 | 3/1967 | Mazzolini et al. | 526/287 X |
| 3,373,147 | 3/1968 | Izumi et al. | 526/341 X |
| 3,781,248 | 12/1973 | Sakai et al. | 526/287 X |
| 3,931,120 | 1/1976 | Shichijo et al. | 526/287 X |
| 4,007,232 | 2/1977 | Yamazaki et al. | 260/836 |
| 4,163,089 | 7/1979 | Palethorpe | 526/87 X |

*Primary Examiner*—Joseph L. Schofer
*Assistant Examiner*—S. Babajko
*Attorney, Agent, or Firm*—Armstrong, Nikaido, Marmelstein & Kubovcik

[57] ABSTRACT

An acrylonitrile polymer comprising acrylonitrile, at least one of vinyl chloride and vinylidene chloride, a sulfo group-containing vinyl monomer having a higher reactivity ratio than acrylonitrile and a methallyl sulfonic acid monomer, which is prepared by conducting a polymerization in a manner such that at least half amount of the methallyl sulfonic acid monomer to be used is added to the polymerization system in a substantial period of adding the sulfo group-containing vinyl monomer having a higher reactivity ratio than acrylonitrile to the system. The acrylonitrile polymer is suitable for the preparation of a modacrylic synthetic fiber, and the modacrylic fiber prepared therefrom has excellent flame resistance, devitrification preventing property and dyeing affinity.

3 Claims, No Drawings

ACRYLONITRILE POLYMER, PROCESS FOR THE PREPARATION THEREOF AND FIBER PREPARED THEREFROM

BACKGROUND OF THE INVENTION

The present invention relates to an acrylonitrile polymer capable of providing a fiber having excellent flame resistance, devitrification preventing property and dye-affinity, a process for the preparation thereof, and a modacrylic synthetic fiber made of the acrylonitrile polymer.

Acrylic fibers have various excellent chemical and physical properties such as dyeing affinity, hand touchness and fastness to light. In recent years, a demand for antiflaming of textile goods is rapidly increasing, and in particular, the flammability of acrylic fibers is in significant question. Acrylic fibers are essentially lacking in flame resistance, and accordingly are unsuitable for use in interior goods requiring antiflammability such as curtain and carpet, and clothes for babies, children and the old.

In order to improve this defect, there have hitherto been proposed various processes, e.g. a process in which a flame proofing agent is added to a spinning solution and the spinning is conducted, a process in which a flame proofing agent is incorporated into fibers by post-treatment, and a process in which a mixture of a flame resisting polymer and an acrylic polymer is extruded into a coagulation bath. However, these processes are not satisfactory for the reason that necessity of the use of large amounts of a flame proofing agent decreases the physical properties and hand touchness of acrylic fibers, or the flame resistance decreases due to elution of a flame proofing agent in dyeing and washing, or industrial production by a mix spinning process is difficult due to difficulty in maintaining a mixed spinning solution uniform and stable.

On the other hand, as a process for semipermanently imparting flame resistance to acrylic fibers, there has been carried out a process in which acrylonitrile is copolymerized with a halogen-containing monomer such as vinyl chloride, vinylidene chloride, vinyl bromide or vinylidene bromide. In that case, the larger the content of a halogen in the obtained copolymer, the better the flame resistance. However, the process has a fatal defect that the devitrification preventing property is remarkably lowered with increasing the halogen content, whereby physical properties, processing property and commercial value of the fibers are impaired. The reason is considered to be that since acrylic fibers containing a large amount of halogenated vinyl monomer units are generally prepared by a wet spinning process, fine voids are easy to be formed in fiber structure, and moreover since the softening point of the fibers is low, the fibers are easy to swell in a relatively low temperature range. For such reasons, it is particularly important to prevent the formation of fine voids in fiber structure in a coagulation bath in order to improve the devitrification property.

In case of the so-called acrylic synthetic fibers containing not less than 85% by weight of acrylonitrile, prevention of the devitrification has been generally conducted by copolymerizing with a sulfo group-containing vinyl monomer which also provides the fibers with dyeing sites. However, in case of the so-called modacrylic synthetic fibers which contain a large amount of halogenated vinyl monomer units, it is essentially difficult to form a dense fiber structure and, therefore, not only prevention of the devitrification is very difficult even if a sulfo group-containing vinyl monomer is incorporated, but also the incorporation of a sulfo group-containing vinyl monomer may rather bring about further decrease of devitrification preventing property. It is of urgent necessity for the fiber and textile industry to raise the devitrification preventing property of modacrylic fibers to the degree of the acrylic fibers.

Improvement of the devitrification of modacrylic fibers from the polymerization side has also been attempted. For instance, it is hitherto attempted to use sodium methallyl sulfonate as a sulfo group-containing monomer. However, since the double bond of sodium methallyl sulfonate is active and has a large chain transfer action, the polymerization reaction is disturbed or the degree of polymerization of the produced polymer becomes small, and accordingly it is difficult to prepare industrially useful copolymers. Even if these defects are mitigated by decreasing the amount of use, satisfactory synthetic fibers are not obtained, because the devitrification is not sufficiently improved and moreover the dyeing affinity is low.

It is also attempted to improve the devitrification of a fiber made of an acrylonitrile polymer containing halogenated vinyl monomer units by employing a high reactive sulfo group-containing vinyl monomer such as sodium styrene sulfonate. Since the reactivity of such a sulfo group-containing monomer is high, a copolymer having a high hydrophilic property is produced in large quantities in an early stage of the polymerization or in a short period of time after the addition of the monomer, when a monomer mixture containing the sulfo group-containing monomer with other monomers such as acrylonitrile and a halogenated vinyl monomer is subjected to the polymerization or the sulfo group-containing monomer is added to the system at one time in the course of the polymerization. In case of preparing a synthetic fiber from the thus produced polymer, the devitrification can be improved in its own way. However, the obtained fiber has a decreased dyeing affinity. The reason is considered to be that the portion of the polymer having a high hydrophilic property is eluted during washing with water in a post-treatment step of the polymer or at the time of coagulation or washing with water in a spinning step.

It is an object of the present invention to provide an acrylonitrile polymer capable of providing a fiber having excellent flame resistance, devitrification preventing property and dyeing affinity.

A further object of the invention is to provide a process for preparing the acrylonitrile polymer.

Another object of the invention is to provide a modacrylic fiber having excellent flame resistance, devitrification preventing property and dyeing affinity.

These and other objects of the present invention will become apparent from the description hereinafter.

SUMMARY OF THE INVENTION

It has now been found that a modacrylic fiber made of a copolymer containing as main components acrylonitrile and at least one of vinyl chloride and vinylidene chloride in a specific ratio has a high flame resistance, and that when, in the preparation of the copolymer, a specific combination of sulfo group-containing vinyl monomers is employed and they are added to the polymerization system in a particular manner, the produced copolymer provides a modacrylic fiber having an excellent devitrification preventing effect and an excellent dyeing affinity.

In accordance with the present invention, there is provided an acrylonitrile polymer comprising 40 to 80% by weight of acrylonitrile, 16 to 59.9% by weight of at least one of vinyl chloride and vinylidene chloride and 0.1 to 4% by weight of a mixture of a sulfo group-containing vinyl monomer having a higher reactivity ratio than acrylonitrile and a methallyl sulfonic acid monomer, said acrylonitrile polymer being prepared by conducting a polymerization in which at least half amount of the methallyl sulfonic acid monomer to be used is added to the polymerization system in a substantial period of adding the sulfo group-containing vinyl monomer having a higher reactivity ratio than acrylonitrile to the polymerization system.

A modacrylic synthetic fiber made of the acrylonitrile polymer of the present invention has excellent flame resistance, devitrification preventing property and dyeing affinity. Accordingly, the present invention also provides a modacrylic fiber prepared from the above acrylonitrile polymer.

Further, in accordance with the present invention, there is provided a process for preparing an acrylonitrile polymer comprising 40 to 80% by weight of acrylonitrile, 16 to 59.9% by weight of at least one of vinyl chloride and vinylidene chloride and 0.1 to 4% by weight in total of a sulfo group-containing vinyl monomer having a higher reactivity ratio than acrylonitrile and a methallyl sulfonic acid monomer by conducting a polymerization in which at least half amount of the methallyl sulfonic acid monomer to be used is added to the polymerization system in a substantial period of adding the sulfo group-containing vinyl monomer having a higher reactivity ratio than acrylonitrile to the polymerization system.

DETAILED DESCRIPTION

It is necessary that the acrylonitrile copolymer of the present invention contains, as main components, 40 to 80% by weight of acrylonitrile units, 16 to 59.9% by weight of units of at least one monomer selected from vinyl chloride and vinylidene chloride, and 0.1 to 4% by weight in total of units of a sulfo group-containing vinyl monomer which has a higher reactivity ratio than acrylonitrile, and a methallyl sulfonic acid monomer. The term "methallyl sulfonic acid monomer" as used herein comprehends methallyl sulfonic acid and a metal salt of methallyl sulfonic acid such as sodium methallyl sulfonate. When the content of acrylonitrile is less than 40% by weight, it is difficult to maintain properties required for synthetic fibers, including the devitrification preventing property, and when the content of acrylonitrile is more than 80% by weight, an effective flame resistance is hard to obtain, though the characteristics required for synthetic fibers are satisfied. Also, when the content of vinyl chloride and/or vinylidene chloride is less than 16% by weight, an effective flame resistance is hard to obtain, and when the content is more than 59.9% by weight, it is hard to maintain characteristics required for synthetic fibers, though the fiber obtained from the polymer is resistant to flame.

The total content of the methallyl sulfonic acid monomer and the sulfo group-containing vinyl monomer having a higher reactivity ratio than acrylonitrile in the acrylonitrile polymer of the present invention is from 0.1 to 4% by weight, preferably 0.3 to 3% by weight. When the content is less than 0.1% by weight, the hydrophilic property of the copolymer is small and it is difficult to provide a dense coagulation structure, and therefore it is difficult to prevent the devitrification of a fiber. Also, when the content is more than 4% by weight, the hydrophilic property of the copolymer becomes too large, and consequently the coagulation does not occur uniformly, thus resulting in formation of many voids in fibers or elution of a copolymer containing the sulfo group-containing vinyl monomer units in large quantities into a coagulation bath and a washing bath. Therefore, it is hard to obtain stably desired qualities such as the devitrification preventing property and dyeing affinity. In addition, the necessity of the sulfo group-containing vinyl monomer in a large amount increases the preparation cost and is economically disadvantageous.

The sulfo group-containing vinyl monomers having a higher reactivity ratio than acrylonitrile (hereinafter referred to as "high reactive sulfo group-containing vinyl monomer") used in the present invention include, for instance, sulfo group-containing acrylates and methacrylates such as methacryloyloxypropylsulfonic acid, sulfo group-containing vinyl monomers having styrene type unsaturated bond such as styrene sulfonic acid and vinylbenzyl sulfonic acid, and salts thereof such as sodium salt, potassium salt and ammonium salt. These monomers may be employed alone or in admixture thereof. The most preferable high reactive sulfo group-containing vinyl monomer is sodium styrene sulfonate.

The methallyl sulfonic acid monomers used in the present invention include methallyl sulfonic acid and salts thereof such as sodium methallyl sulfonate, potassium methallyl sulfonate and ammonium methallyl sulfonate. Sodium methallyl sulfonate is particularly preferred.

From the viewpoint of stably and effectively obtaining the devitrification preventing property and the dyeing affinity, it is desirable that the ratio of the high reactive sulfo group-containing vinyl monomer to the methallyl sulfonic acid monomer is from ¼ to 9/1 by weight, especially ⅓ to 7/1 by weight, more especially ½ to 5/1 by mole.

The high reactive sulfo group-containing vinyl monomer may be added to the polymerization system at any time, e.g. before starting the polymerization, in the course of the polymerization or the combination thereof. However, from the point of a manner of using the methallyl sulfonic acid monomer, the reactivity of the methallyl sulfonic monomer or the viscosity of the polymerization system, it is desirable that the addition of the high reactive sulfo group-containing vinyl monomer is completed before a relative polymerization yield (weight percent of the polymer produced by that time based on the whole polymer to be produced) reaches 70% by weight. As a manner of adding the high reactive sulfo group-containing vinyl monomer to the polymerization system, there is preferred a manner such that the high reactive sulfo monomer is added so that the weight percent of the polymer produced in a period of actual addition of the high reactive sulfo monomer based on the whole polymer to be produced is not more than 40%, especially not more than 25%. In case of intermittently adding the high reactive sulfo monomer, the polymer produced during the interruption of the addition of the high reactive sulfo monomer is not taken into account. The reason is that the addition of the high reactive sulfo group-containing vinyl monomer at a rate higher than some extent produces a hydrophilic polymer and a hydrophobic polymer and rather improves the devitrification preventing property of a fiber.

At least half amount of the methallyl sulfonic acid monomer to be used is added to the polymerization system in a substantial period of adding the high reactive sulfo group-containing vinyl monomer to the polymerization system. It is the most preferable that the whole amount of the methallyl sulfonic acid monomer to be used is added to the polymerization system in a substantial period of adding the high reactive sulfo group-containing vinyl monomer to the system. The term "substantial period of adding the high reactive sulfo group-containing vinyl monomer to the polymerization system" as used herein means a period such that in case of intermittently adding the high reactive sulfo monomer to the system, a period of interruption of the addition of the monomer is not included in the substantial period, and such that even if actual addition of the high reactive sulfo monomer is completed or interrupted, a period before the monomer is almost consumed is included in the substantial period. To be concrete, a period between a point of time when the addition of the high reactive sulfo group-containing vinyl monomer is completed or interrupted and a point of time when a polymer is further produced in an amount of 10% by weight of the whole polymer to be produced is included in the substantial period of adding the high reactive sulfo group-containing vinyl monomer to the system. On the other hand, even if a small amount of the methallyl sulfonic acid monomer is added outside the above-mentioned substantial period, it does not always largely impair the effects of the invention. Therefore, the addition of the methallyl sulfonic acid monomer outside the substantial period of adding the high reactive sulfo monomer is also permitted to some extent. The permissible amount of the methallyl sulfonic acid monomer added to the system outside the above-mentioned substantial period is less than 1% by weight, preferably less than 0.5% by weight, more preferably less than 0.2% by weight, based on the whole polymer to be produced. At least half of the whole amount of the methallyl sulfonic acid monomer to be used should be added in a substantial period of adding the high reactive sulfo group-containing vinyl monomer to the system. The amount of the methallyl sulfonic acid monomer added in this period of time is preferably not less than 75% by weight of the whole amount of use, more preferably not less than 90% by weight of the whole amount of use, and is the most preferably the whole amount as stated above. The addition of the whole amount of the methallyl sulfonic acid monomer prior to starting the polymerization is permitted, if the high reactive sulfo group-containing vinyl monomer is added to the system prior to starting the polymerization, but it is not always desirable from the viewpoint of the degree of polymerization of a polymer produced in an early stage of the polymerization and the rate of polymerization. Therefore, in case of adding the methallyl sulfonic acid monomer to the system before starting the polymerization, the amount is at most 80% by weight, preferably at most 60% by weight, more preferably at most 40% by weight, of the whole amount of the methallyl sulfonic acid to be used.

The reason why the rate of polymerization and the degree of polymerization are maintained good and moreover the dyeing affinity and the devitrification preventing property of a fiber prepared from the polymer of the invention can be improved is considered as follows: Since the high reactive sulfo group-containing vinyl monomer and the methallyl sulfonic acid monomer coexist in the polymerization system, the propagation reaction of the high reactive sulfo monomer and the chain transfer reaction of the methallyl sulfonic acid monomer are adequately hindered. Consequently, the lowering of the degree of polymerization observed in the case where only the methallyl sulfonic acid monomer is used, is greatly prevented by the presence of the high reactive sulfo monomer, and on the other hand, the production of a copolymer having a very high hydrophilic property observed in the case where only the high reactive sulfo monomer is used, is prevented by the presence of the methallyl sulfonic acid monomer. From the above reason, it is considered that in the polymer of the present invention, the proportion of a copolymer containing sulfo group to the whole copolymer and the content of sulfo group in the sulfo group-containing copolymer are well balanced. Therefore, in the preparation of the polymer of the present invention, it is preferable that the high reactive sulfo group-containing vinyl monomer and the methallyl sulfonic acid monomer adequately coexist in the polymerization system. In particular, it should be avoided that a large amount of the methallyl sulfonic acid monomer is present at a point of time when the high reactive sulfo group-containing vinyl monomer is not present. In general, for preventing the devitrification upon preparing a modacrylic synthetic fiber from a polymer containing halogenated vinyl monomer units, it is necessary to prevent the formation of fine voids in the fiber structure is a coagulation bath. For this purpose, it is essential to prepare a polymer capable of forming continuously a uniform, dense coagulation structure in a coagulation bath. The polymer of the present invention has well balanced proportion of a copolymer portion containing sulfo group to the whole copolymer and content of sulfo group in the sulfo group-containing copolymer. Therefore, it is considered that a hydrophilic copolymer and a relatively hydrophobic copolymer ideally form a complete whole so as to continuously exhibit a uniform precipitating behavior upon spinning, whereby a dense coagulation structure is formed so as to prevent the devitrification and highly stabilize the dyeing affinity.

In addition to units of acrylonitrile, vinyl chloride and/or vinylidene chloride, high reactive sulfo group-containing vinyl monomer and methallyl sulfonic acid monomer, the acrylonitrile copolymer of the present invention may contain units of a small amount of other monoolefinic monomer copolymerizable therewith, as occasion demands. The copolymerizable monoolefinic monomers include, for instnce, acrylic acid, methacrylic acid, acrylates, methacrylates, acrylamide, methacrylamide, vinyl acetate, vinyl bromide, sodium allylsulfonate, 2-acrylamide-2-methylpropane sulfonic acid and its salts, and the like. The content of the copolymerizable monoolefinic monomers in the copolymer is at most 10% by weight. In case of using a sulfo group-containing monomer having a lower reactivity ratio than acrylonitrile as other copolymerizable monoolefinic monomers, it should be employed in an amount such that the hydrophobic property of the hydrophobic polymer portion is not impaired.

The copolymer of the present invention may be prepared by any polymerization processes, e.g. emulsion polymerization in an aqueous medium or an aqueous medium containing an organic solvent, and solution polymerization. In case of adopting an emulsion polymerization process, an anionic surface active agent is effectively employed. The anionic surface active agent may be employed in combination with a small amount of a usual non-ionic surface active agent. Examples of the anionic surface active agent are, for instance, fatty acid salts, sulfates, sulfonates and phosphates. The surface active agent is employed in an amount of 0.1 to 10% by weight, preferably 0.5 to 5% by weight, based on the total weight of the monomers used. In case of adopting a solution polymerization process, solvents having a relatively small chain transfer constant are preferably employed, e.g. ethylene carbonate, dimethylsulfoxide, dimethylformamide and dimethylacetoamide, and dimethylformamide is particularly preferred. These solvents used as a polymerization medium may contain a small amount of water or other organic solvents, unless the uniform solubility of the polymer and the polymerizability are prevented.

Usual radical polymerization initiators are employed as catalysts for polymerization. Examples of the polymerization initiators are, for instance, persulfates such as ammonium persulfate and potassium persulfate, combinations of persulfates such as ammonium persulfate with hydrogensulfites such as sodium hydrogensulfite, azo compounds such as 2,2'-azobis(2,4-dimethylvaleronitrile) and 2,2'-azobisisobutyronitrile, peroxides such as di(2-ethylhexyl) peroxydicarbonate, t-butyl peroxypivalate and lauroyl peroxide, and combinations of peroxides such as hydrogen peroxide with organic reducing agents such as L-ascorbic acid. They are suitably selected according to the polymerization process.

The polymerization temperature is selected from 30° to 70° C. The concentration of the monomers in the polymerization system is from 10 to 70% by weight.

In case of an emulsion polymerization process, a polymer powder is obtained from the reaction mixture usually by separating the polymer employing an aqueous solution of an electrolyte which is a salt used for salting-out, such as sodium chloride, calcium chloride, magnesium sulfate or aluminum sulfate, and then filtering, washing with water, dehydrating and drying.

In removal of the unreacted monomers such as acrylonitrile, vinyl chloride and vinylidene chloride from the reaction mixture obtained in a solution polymerization, if vinyl chloride remains in the reaction mixture, most of vinyl chloride is first removed under ordinary pressure, and other unreacted monomers such as acrylonitrile and vinylidene chloride are then removed under reduced pressure. The removal under reduced pressure is preferably conducted at 10 to 200 mmHg and 40° to 90° C. In that case, if necessary, an organic solvent as used in the polymerization may be suitably added to the reaction mixture in the respective removing steps in order to make the removal of the unreacted monomers easy and to adjust the concentration of the polymer.

It is desirable that the polymer of the present invention has a specific viscosity (measured at 30° C. by employing a solution of 2 g. of the polymer in 1 liter of dimethylformamide) of 0.13 to 0.60, especially 0.15 to 0.54.

Usual wet and dry spinning processes are adoptable for the preparation of a fiber from the polymer of the present invention, and a wet spinning process is particularly preferable. Usual solvents for acrylonitrile polymers may be employed as solvents for preparing a spinning solution, e.g. acetonitrile, acetone, dimethylacetoamide, dimethylformamide and dimethylsufoxide. Since the polymer is uniformly dissolved, dimethylformamide, dimethylacetoamide and dimethylsulfoxide, particularly dimethylformamide, are preferred. The spinning solution or the reaction mixture obtained by a solution polymerization and used as a spinning solution may, as occasion demands, contain additives, e.g. a stabilizer such as an epoxy compound, an organotin compound or an organic reducing agent, an agent for improving the hand touchness such as a titanium compound or an aluminum compound, a flame retardant such as an antimony compound, a tin compound or a bromine compound. The concentration of the polymer in the spinning solution is selected from 15 to 40% by weight. The wet spinning is carried out usually by extruding the spinning solution into a 10 to 80% by weight aqueous solution of a solvent to form a filament, drawing the filament, washing with water and drying. If necessary, the obtained filament may be further drawn and heat-treated.

Thus, according to the present invention, the defects of conventional acrylonitrile synthetic fibers can be overcome, and there is provided a fiber having excellent flame resistance, devitrification preventing property and dyeing affinity.

The present invention is more specifically described and explained by means of the following Examples, in which all parts and % are by weight unless otherwise noted.

In the following Examples, the flame resistance, devitrification preventing property and dyeing affinity of a fiber are measured and estimated as follows:

The flame resistance is measured by the limited oxygen index method employing a limited oxygen index combustion tester. Each sample used in the measurement is prepared in the following way. First, 6 multifilaments, each having 300 single filaments (single filament: 3 deniers), are twisted 75 turns per 25 inches and two of such twisted filaments are then combined together to form a rope sample. The sample is then shrinked by 70% and is put in a holder of a combustion tester in an erect posture. The sample is burnt, and oxygen percent necessary to keep burning by 5 cm. is measured. The larger the value, the better the flame resistance.

The devitrification preventing property is estimated by visual determination. A filament of 3 deniers is treated in a boiling water for 3 hours and dried at 60° C. for 90 minutes. The treated filament is compared with the nontreated filament.

The dyeing affinity is estimated on the basis of the degree of exhaustion of Malachite Green dye. A filament of 3 deniers is dyed in a boiled 2.5% by weight aqueous solution of the dye for 90 minutes and the degree of exhaustion is measured. The larger the value, the better the dyeing affinity.

Also, in the following Examples, the yield of a polymer shows a value calculated according to the following equation:

$$\text{Yield of polymer (\% by weight)} = \frac{(\text{Amount of polymer produced}) \times 100}{\left(\begin{array}{c}\text{Total amount of}\\ \text{monomers added to}\\ \text{polymerization system}\end{array}\right) - \left(\begin{array}{c}\text{Amount of}\\ \text{unreacted vinyl}\\ \text{chloride recovered}\end{array}\right)}$$

EXAMPLE 1

In a 15 liter pressure polymerization vessel, an emulsion polymerization was carried out by employing 40.4 parts of acrylonitrile (AN), 12.8 parts of vinylidene chloride (VD), 45.0 parts of vinyl chloride (VC), 260 parts of water, a combination as a polymerization initiator of 0.12 part of ammonium persulfate, 0.06 part of sodium hydrogensulfite, 0.36 part of sulfur dioxide and 0.0015 part of ferrous sulfate, and 1.2 parts of sodium laurylsulfate as an emulsifier. The polymerization was conducted at 40° C. for 6 hours.

In the emulsion polymerization, all of 1.2 parts of sodium vinylbenzylsulfonate (VBSA) as a high reactive sulfo group-containing vinyl monomer and 0.6 part of sodium methallyl sulfonate (SMAS) as a methallyl sulfonic acid monomer were added at one time to the polymerization system 1 hour after starting the polymerization. The yield of a polymer after 1 hour from starting the polymerization was 17.4%. Also, in order to maintain the composition of the produced polymer uniform, 29.6 parts out of 40.4 parts of AN and 4.6 parts out of 12.8 parts of VD were continuously added to the system throughout the polymerization, and in order to maintain the polymerization rate constant, a part of ammonium persulfate was continuously added to the system.

An aqueous solution of sodium chloride was added to the obtained reaction mixture to salt-out a polymer, and the polymer was washed with hot water, filtered and dried. The thus obtained polymer consisted of 49.4% of AN, 15.3% of VD, 33.5% of VC, 1.5% of VBSA and 0.3% of SMAS, and had a specific viscosity of 0.208. The yield of the polymer at a point of time when 17.9 parts of the unreacted VC was recovered, was 95.5%.

The polymer was dissolved in dimethylformamide to give a 35% spinning solution. Wet spinning was conducted by extruding the spinning solution into a 57% aqueous solution of dimethylformamide, washing the formed filament with water, drying, drawing and heat-treating to give a modacrylic synthetic fiber. Even if the synthetic fiber was treated in boiled water, the gloss of the original fiber was not lost and the fiber had an excellent devitrification preventing property. The degree of exhaustion was 98.8%, and the limited oxygen index was 31.7, and thus, the fiber had excellent dyeing affinity and flame resistance.

COMPARATIVE EXAMPLE 1

An emulsion polymerization was carried out by employing only VBSA as a monomer containing sulfo group. The polymerization conditions were the same as those in Example 1 except that VC and ammonium persulfate were employed in amounts of 45.3 parts and 0.1 part, respectively. In the emulsion polymerization, all of 1.5 parts of VBSA was added to the polymerization system before starting the polymerization, and also, since it was expected that a copolymer having a very high hydrophilic property would be produced in part and it would be eluted in salting-out and washing steps, cold water was used in washing.

The obtained polymer had a composition of 49.1% of AN, 15.2% of VD, 33.9% of VC and 1.8% of VBSA, and had a specific viscosity of 0.225. The yield of the polymer at a point of time when 18.1 parts of the unreacted VC was recovered was 96.1%.

The wet spinning was conducted in the same manner as in Example 1. The obtained synthetic fiber had a degree of exhaustion of 52.2%, thus poor in dyeing affinity, since a copolymer having a high hydrophilic property was eluted into a coagulation or washing bath.

COMPARATIVE EXAMPLE 2

An emulsion polymerization was carried out by employing only SMAS as a monomer containing sulfo group. The polymerization conditions were the same as those in Example 1 except that VC and ammonium persulfate were employed in amounts of 43.2 parts and 0.24 part, respectively. In the emulsion polymerization, all of 3.6 parts of SMAS was added to the polymerization system before starting the polymerization.

The obtained polymer had a composition of 49.6% of AN, 14.5% of VD, 34.2% of VC and 1.7% of SMAS. The specific viscosity was 0.137 which was lower than that of the polymer obtained in Example 1, and the reason was considered that the chain transfer reaction of SMAS acted on the polymerization. The yield of the polymer at a point of time when 17.7 parts of the unreacted VC was recovered was 92.1% which was lower than the yield in Example 1 inspite of the use of ammonium persulfate in an amount of 2 times that in Example 1.

The wet spinning was conducted in the same manner as in Example 1. The devitrification preventing property of the obtained synthetic fiber was not improved at all, and also the physical properties of the fiber were not good.

EXAMPLE 2

In a 15 liter pressure polymerization vessel, an emulsion polymerization was carried out by employing 50.7 parts of AN, 17.8 parts of VD, 29.0 parts of VC, 320 parts of water, a combination as a polymerization initiator of 0.9 part of ammonium persulfate, 0.1 part of sodium hydrogensulfite, 0.36 part of sulfur dioxide and 0.002 part of ferrous sulfate, and 1.5 parts of sodium laurylsulfate as an emulsifier. The polymerization was conducted at 38° C. for 7 hours.

In the emulsion polymerization, all of 1.5 parts of sodium methacryloyloxypropylsulfonate (SPMA) as a high reactive sulfo group-containing vinyl monomer and 1.0 part of SMAS as a methallyl sulfonic acid monomer were added at one time to the polymerization system after 1 hour (yield of polymer: 15.6%) from starting of the polymerization. In order to maintain the composition of the produced polymer uniform, 33.7 parts out of 50.7 parts of AN and 12 parts out of 17.8 parts of VD were continuously added to the system throughout the polymerization, and also, in order to maintain the polymerization rate constant, a part of ammonium persulfate was continuously added to the system.

Salting-out was conducted by adding an aqueous solution of sodium chloride to the obtained reaction mixture, and the polymer was washed with hot water, filtered and dried. The obtained polymer had a composition of 56.6% of AN, 19.4% of VD, 22.4% of VC, 1.7% of SPMA and 0.6% of SMAS, and had a specific viscosity of 0.254. The yield of the polymer at a point of time when 8.6 parts of the unreacted VC was recovered was 95.5%.

The polymer was dissolved in dimethylformamide to give a 32% spinning solution, and wet spinning was carried out in the same manner as in Example 1. The obtained synthetic fiber had an excellent devitrification preventing property. The degree of exhaustion was 94.8% and the limited oxygen index was 30.2, thus the fiber had excellent dyeing affinity and flame resistance.

EXAMPLES 3 AND 4 AND COMPARATIVE EXAMPLES 3 AND 4

In a 30 liter pressure polymerization vessel, a solution polymerization was carried out at 50° C. for 12 hours by employing 61.5 parts of AN, 36.9 parts of VD, 1.6 parts of sodium styrene sulfonate (SSS) and/or sodium methallyl sulfonate (SMAS), 96 parts of dimethylformamide as a solvent, and 0.26 to 0.33 part of azobisdimethylvaleronitrile as a polymerization initiator. In the polymerization, all of SSS and SMAS were added at one time to the system after 1 hour (yield of polymer: 8.2%) from starting of the polymerization. The amount of the initiator was adjusted so that the yield of polymerization was 60 to 62%.

As shown in Table 1, the obtained polymer had a composition of 57 to 58% of AN, 39 to 40% of VD and 2.3 to 2.5% in total of SSS and SMAS, and had a specific viscosity of 0.24 to 0.49.

To the reaction mixture was added 90 parts of dimethylformamide and the unreacted monomers were removed at 15 mmHg and 50° C. from the diluted reaction mixture to give a 30% solution of the polymer. By employing the thus obtained solution as a spinning solution, wet spinning was conducted by extruding it into a 60% aqueous solution of dimethylformamide.

The properties of the obtained synthetic fiber are shown in Table 1.

TABLE 1

|  | Amount of sulfo group-containing monomer (part) | | Composition of polymer (%) | | | | Specific viscosity | Devitrification preventing property | Dyeing affinity (%) |
| --- | --- | --- | --- | --- | --- | --- | --- | --- | --- |
|  | SSS | SMAS | AN | VD | SSS | SMAS |  |  |  |
| Ex. 3 | 0.8 | 0.8 | 58.3 | 39.4 | 1.2 | 1.1 | 0.251 | good | 97.1 |
| Ex. 4 | 0.6 | 1.0 | 57.2 | 40.3 | 1.0 | 1.5 | 0.237 | good | 99.9 |
| Com. Ex. 3 | 1.6 | 0 | 57.9 | 39.6 | 2.5 | 0 | 0.491 | bad | 48.8 |
| Com. Ex. 4 | 0 | 1.6 | — | — | — | — | — | — | — |

The fibers obtained in Examples 3 and 4 had excellent devitrification preventing property and dyeing affinity. The fiber obtained in Comparative Example 3 was bad in dyeing affinity, and also the devitrification preventing property thereof was not always satisfactory. The reason is considered to be that since only SSS is used as a monomer containing sulfo group, a high hydrophilic copolymer is produced in part and it is eluted into a spinning bath. In Comparative Example 4, the rate of polymerization was very slow and the yield of the polymerization was very low, i.e. about 20%. Therefore, the study of spinning was stopped.

EXAMPLES 5 TO 8

In order to observe the influence of a manner of adding monomers containing sulfo group upon the devitrification preventing property and the dyeing affinity, a solution polymerization was carried out at 50° C. for 12 hours by employing 61.5 parts of AN, 36.9 parts of VD, 74 parts of dimethylformamide as a solvent and 0.31 part of azobisdimethylvaleronitrile as a polymerization initiator. Upon conducting the polymerization, 0.8 parts of SSS was dissolved in 12 parts of dimethylformamide and 0.8 part of SMAS was dissolved in a mixture of 8 parts of dimethylformamide and 2 parts of water, and the obtained solutions were added to the polymerization system in a manner shown in Table 2.

The obtained polymer had a composition of 57 to 59% of AN, 39 to 41% of VD, 1.1 to 1.3% of SSS and 1.0 to 1.2% of SMAS, and a specific viscosity of 0.25 to 0.28. The yield of polymerization was from 60 to 62%. The obtained reaction mixture was subjected to the wet spinning in the same manner as in Example 3 to give a synthetic fiber.

The properties of the obtained fiber are shown in Table 2.

TABLE 2

| | Time of adding SSS and SMAS after starting polymerization | | Specific viscosity | Devitrification preventing property | Dyeing affinity (%) |
| --- | --- | --- | --- | --- | --- |
| | SSS | SMAS | | | |
| Ex. 5 | 0 hour | 0 to 0.5 hour | 0.266 | good | 92.3 |
| Ex. 6 | 0 to 1 hour | 0 to 1 hour | 0.269 | good | 97.5 |
| Ex. 7 | 0 to 1 hour | 1 hour | 0.280 | good | 99.4 |
| Ex. 8 | 0 hour plus 0 to 0.5 hour | 0 hour plus 0 to 0.5 hour | 0.262 | good | 96.8 |

In Example 5, the whole amount of SSS was added at a time to the system before starting the polymerization, and SMAS was continuously added to the system over 0.5 hour so that the addition was completed 0.5 hour (yield of polymer 4.3%) after starting the polymerization. In Example 6, SSS and SMAS were continuously added to the system at a constant rate over 1 hour up to the first hour after starting the polymerization. In Example 7, SSS was continuously added to the system at a constant rate up to the first hour, and SMAS was added 1 hour after starting the polymerization at a time. In Example 8, 30% of each of SSS and SMAS was added at a time to the system before starting the polymerization, and the residue was continuously added to the system at a constant rate up to 30th minutes after starting the polymerization.

The obtained fibers had an excellent devitrification preventing property. Also, the degree of exhaustion was not less than 90% and the limited oxygen index was from 29 to 30, thus the fibers had excellent dyeing affinity and flame resistance.

In addition to the ingredients used in the Examples, other ingredients can be used in the Examples as set forth in the specification to obtain substantially the same results.

What we claim is:

1. An acrylonitrile polymer consisting essentially of 40 to 80% by weight of acrylonitrile, 16 to 59.9% by weight of at least one of vinyl chloride and vinylidene chloride, 0–10% by weight of a copolymerizable monoolefinic monomer and 0.1 to 4% by weight of a mixture of (A) a sulfo group-containing vinyl monomer having a higher reactivity ratio than acrylonitrile selected from the group consisting of methacryloyloxypropylsulfonic acid, styrene sulfonic acid, vinylbenzylsulfonic acid, and salts thereof and (B) a methallyl sulfonic acid monomer selected from the group consisting of methallyl sulfonic acid and salts thereof, said acrylonitrile polymer being prepared by a solution polymerization process in which (1) the addition of the sulfo group-containing vinyl monomer (A) is completed before 70% by weight of the final polymer is produced, (2) the sulfo group-containing vinyl monomer (A) is added to the polymerization system so that the amount of the polymer produced within the period of actual addition of the sulfo group-containing vinyl monomer (A) is not more than 40% by weight of the final polymer, and (3) at least half the amount of the methallyl sulfonic acid monomer (B) to be used is added to the polymerization system substantially within the addition and reacting period of the sulfo group-containing vinyl monomer (A), the addition and reacting period of the sulfo group-containing vinyl monomer (A) being the total period of the actual addition of the sulfo group-containing vinyl monomer (A) to the polymerization system plus a period subsequent to each addition of the sulfo group-containing vinyl monomer (A) to the polymerization system during which 10% by weight of the final polymer is produced; and wherein the ratio of the sulfo group-containing vinyl monomer (A) to the methallyl sulfonic acid monomer (B) is from $\frac{1}{4}$ to 9/1 by weight; with the proviso that all of the sulfo group-containing vinyl monomer (A) and all of the methallyl sulfonic acid monomer (B) are not added to the polymerization system at one time prior to the initiation of the polymerization reaction.

2. A process for preparing an acrylonitrile polymer consisting essentially of 40 to 80% by weight of acrylonitrile, 16 to 59.9% by weight of at least one of vinyl chloride and vinylidene chloride, 0–10% by weight of a copolymerizable monoolefinic monomer and 0.1 to 4% by weight of a mixture of (A)a sulfo group-containing vinyl monomer having a higher reactivity ratio than acrylonitrile selected from the group consisting of methacryloyloxypropylsulfonic acid, styrene sulphonic acid, vinylbenzylsulfonic acid, and salts thereof and (B) a methallyl sulfonic acid monomer selected from the group consisting of methallyl sulfonic acid and salts thereof, wherein said acrylonitrile polymer is prepared by a solution polymerization process in which (1) the addition of the sulfo group-containing vinyl monomer (A) is completed before 70% by weight of the final polymer is produced, (2) the sulfo group-containing vinyl monomer (A) is added to the polymerization system so that the amount of the polymer produced within the period of actual addition of the sulfo group-containing vinyl monomer (A) is not more than 40% by weight of the final polymer, and (3) at least half the amount of the methallyl sulfonic acid monomer (B) to be used is added to the polymerization system substantially within the addition and reacting period of the sulfo group-containing vinyl monomer (A), the addition and reacting period of the sulfo group-containing vinyl monomer (A) being the total period of the actual addition of the sulfo group-containing vinyl monomer (A) to the polymerization system plus a period subsequent to each addition of the sulfo group-containing vinyl monomer (A) to the polymerization system during which 10% by weight of the final polymer is produced; and wherein the ratio of the sulfo group-containing vinyl monomer (A) to the methallyl sulfonic acid monomer (B) is from $\frac{1}{4}$ to 9/1 by weight; with the proviso that all of the sulfo group-containing vinyl monomer (A) and all of the methallyl sulfonic acid monomer (B) are not added to the polymerization system at one time prior to the initiation of the polymerization reaction.

3. A modacrylic synthetic fiber made of a copolymer consisting essentially of 40 to 80% by weight of acrylonitrile, 16 to 59.9% by weight of at least one of vinyl chloride and vinylidene chloride, 0–10% by weight of a copolymerizable monoolefinic monomer and 0.1 to 4% by weight of a mixture of a sulfo group-containing vinyl monomer (A) having a higher reactivity ratio than acrylonitrile selected from the group consisting of methacryloyloxypropylsulfonic acid, styrene sulfonic acid, vinylbenzylsulfonic acid, and salts thereof and a methallyl sulfonic acid monomer (B) selected from the group consisting of methallyl sulfonic acid and salts thereof, said copolymer being prepared by a solution polymerization process in which (1) the addition of the sulfo group-containing vinyl monomer (A) is completed before 70% by weight of the final polymer is produced, (2) the sulfo group-containing vinyl monomer (A) is added to the polymerization system so that the amount of the polymer produced within the period of actual addition of the sulfo group-containing vinyl monomer (A) is not more than 40% by weight of the final polymer, and (3) at least half the amount of the methallyl sulfonic acid monomer (B) to be used is added to the polymerization system substantially within the addition and reacting period of the sulfo group-containing vinyl monomer (A), the addition and reacting period of the sulfo group-containing vinyl monomer (A) being the total period of the actual addition of the sulfo group-containing vinyl monomer (A) to the polymerization system plus a period subsequent to each addition of the sulfo group-containing vinyl monomer (A) to the polymerization system during which 10% by weight of the final polymer is produced; and wherein the ratio of the sulfo group-containing vinyl monomer (A) to the methallyl sulfonic acid monomer (B) is from $\frac{1}{4}$ to 9/1 by weight; with the proviso that all of the sulfo group-containing vinyl monomer (A) and all of the methallyl sulfonic acid monomer (B) are not added to the polymerization system at one time prior to the initiation of the polymerization reaction.

* * * * *